United States Patent [19]

Hayashi

[11] 4,084,768
[45] Apr. 18, 1978

[54] TAPE TENSION IMPARTING APPARATUS

[75] Inventor: Kiyoshi Hayashi, Nagoya, Japan

[73] Assignee: Shin-Shirasuna Electric Corporation, Nagoya, Japan

[21] Appl. No.: 766,544

[22] Filed: Feb. 7, 1977

[30] Foreign Application Priority Data

Feb. 20, 1976 Japan .................................. 51-17727

[51] Int. Cl.² .................... G11B 15/54; G11B 15/30
[52] U.S. Cl. ................................. 242/186; 242/191; 318/6
[58] Field of Search ............... 242/191, 189, 186, 190, 242/75.51, 75.5; 318/6, 7, 313, 309, 310, 311, 312

[56] References Cited

U.S. PATENT DOCUMENTS 3,800,196  3/1974  Zimmermann .................. 242/191 X Primary Examiner—George F. Mautz

[57] ABSTRACT

A method and apparatus for imparting a predetermined tension to a tape transported at a predetermined velocity from one to the other of reels mounted on a pair of reel spindles at least one of which is rotated by a motor to have a rotational torque imparted thereto. A signal is provided which has a frequency proportional to the number of revolutions of the reel spindle; an impulse is produced which has a frequency corresponding to the frequency of said signal; a reference voltage is integrated for a time corresponding to the period of said impulse; the peak value of a signal resulting from said integration is sample-held in accordance with said impulse; and a signal resulting from said sample-holding is applied to the motor, thereby imparting a predetermined tension to the tape.

1 Claim, 1 Drawing Figure

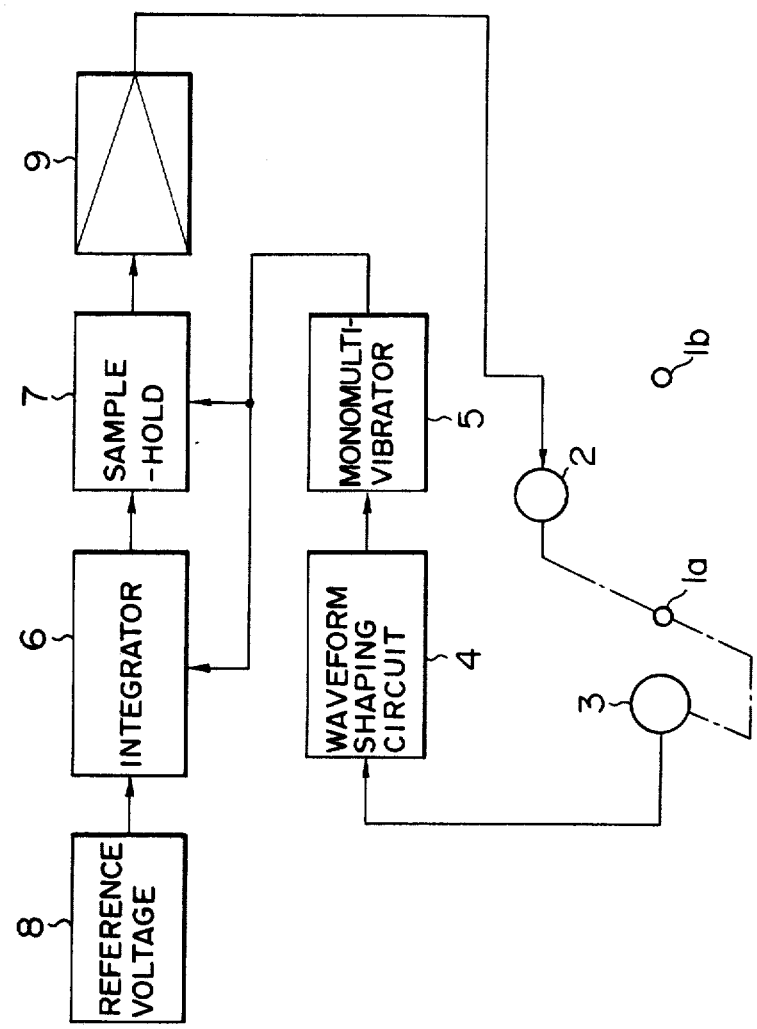

TAPE TENSION IMPARTING APPARATUS

BACKGROUND OF THE INVENTION

1. Field of the Invention

This invention relates to a method of imparting a predetermined tension to a tape-like member transported at a predetermined speed as in tape recorders.

2. Description of the Prior Art

Heretofore, in a tape recorder, the tape transported by a capstan has been taken up from one reel onto another in such a manner that a rotational torque is imparted to the reel spindle on the take-up side to prevent occurrence of slack in the tape while a tension is imparted to the tape to cause the tape to frictionally engage a head with a suitable contact pressure and a brake torque is imparted to the reel spindle on the supply side to stabilize the transport of the tape.

Usually, however, the rotational torque and brake torque so imparted to the take-up reel spindle and the supply reel spindle are constant but the tension imparted to the tape is greatly variable by the amount of the tape wound on the reel mounted on each of the reel spindles. Let the tape tension be $T_e$, the torque of the reel spindle be $T_t$ and the radius of the wound tape on the reel be $r$. These are in the following relation:

$$T_e = \frac{T_t}{r} \quad (1)$$

For this reason, there has been proposed a method of directly detecting the tension in the tape and controlling to impart to the reel spindle such a torque that the tension in the tape becomes constant. However, such method is disadvantageous in that high mechanical accuracy is required and that in the case where the tape is contained in a cassette for example, difficulties are experienced in designing since the space available to detect the tension is limited.

SUMMARY OF THE INVENTION

It is an object of this invention to provide a novel method comprising the steps of detecting the number of revolutions of a reel spindle, instead of directly detecting the tension in the tape as in the prior art, and controlling the torque of the reel spindle on the basis of the result of the detection to thereby maintain the tape tension constant, thus solving all the problems peculiar to the prior art.

Before an embodiment of the present invention is disclosed, description will first be made of the concept underlying the invention. Let the number of revolutions of the reel spindle be $n$, the tape velocity be $v$ and the radius of the wound tape be $r$. Then, the following relation holds true:

$$n = \frac{v}{2\pi r} \quad (2)$$

From this equation and the previously shown equation (1), there is obtained the following relation:

$$T_t = \frac{v T_e}{2\pi r} \quad (3)$$

From this equation, it is seen that the reel spindle torque $T_t$ for making the tape tension $T_e$ constant and the number of revolutions $n$ of the reel spindle are in inversely proportional relation with each other, but great complexity will be involved in the circuit arrangement for providing a signal which will satisfy such inversely proportional relation after the signal representing the number of revolutions $n$ has been taken out. The inventor has variously studied how to obtain a signal which will substantially satisfy the abovementioned inversely proportional relation, without resorting to such a complex circuit arrangement, and as the result, the inventor has hit upon the adoption of a circuit arrangement which is capable of providing a signal proportional to $1/n$ or the period of rotation of the reel spindle; thus, the inventor has ascertained that a sufficiently satisfactory result can be obtained by that circuit arrangement.

Other objects, features and advantages of this invention will become apparent from the following description taken in conjunction with the accompanying drawing.

BRIEF DESCRIPTION OF THE DRAWING

The drawing is a schematic block diagram showing an example of the circuit arrangement which can carry out the method of the present invention.

DESCRIPTION OF THE PREFERRED EMBODIMENT

An embodiment of the present invention will hereinafter be described by reference to the accompanying drawing. Designated by 1a and 1b are a pair of reel spindles on which respective reels (not shown) may be mounted. These reel spindles may be designed such that one or both of them are rotatable by a motor so that a rotational torque may be imparted thereto, but in the shown embodiment the reel spindle 1a is designed to be rotatable by a motor 2, for the sake of convenience. Also, as in the conventional tape recorder, a tape (not shown) may be transported at a predetermined velocity from one of the reels (not shown) mounted on the reel spindles to the other reel. Detector means 3 such as a frequency generator adapted to detect the number of revolutions of the reel spindle 1a is associated with that reel spindle. This detector means 3 may be connected through a suitable waveform shaping circuit 4 to a monomultivibrator circuit 5, as required. Also provided are an integration circuit 6 and a sample hold circuit 7 connected to the output side thereof. The output of the monomultivibrator circuit 5 is connected to the integration circuit 6 and the sample hold circuit 7 to reset the circuit 6 and to sample the circuit 7. Further connected to the integration circuit 6 is a reference voltage source 8 having a predetermined level, and the output of the sample hold circuit 7 is connected to the motor 2 through a suitable amplifier circuit 9.

With the above-described circuit arrangement, a signal having a frequency proportional to the number of revolutions of the reel spindle 1a is produced by the detector means 3 and such signal is waveform-shaped by the waveform shaping circuit 4, and then applied to the monomultivibrator circuit 5; as a result, monomultivibrator circuit 5 produces an impulse having a frequency corresponding to the period of the signal having the frequency proportional to the aforementioned number of revolutions. On the other hand, the reference voltage from the reference voltage source 8 is supplied to the integration circuit 6 which is reset by said impulse, so that a saw-tooth wave having a period equal to the aforementioned period is produced at the output side of the integration circuit 6 and such saw-tooth wave is applied to the sample hold circuit 7 which is sampled by said impulse, and there is thus produced at the output side of the circuit 7 a signal corresponding to the peak value of the saw-tooth wave. The signal so produced is one proportional to the reciprocal ($1/n$) of the number of revolutions $n$, namely, the period of revolution, of the reel spindle 1a. Thereafter, that signal is supplied to the motor 2 through the amplifier circuit 9, whereby a predetermined tension is imparted to the tape.

According to the present invention, as will be appreciated, a signal having a frequency proportional to the number of revolutions of the reel spindle is detected and this signal is processed by a relatively simple and inexpensive circuit arrangement including the impulse generating circuit, the integration circuit, the sample hold circuit, etc., whereby there may be produced a signal proportional to the inverse number of the number of revolutions, namely, the period of revolution, of the reel spindle, and this means the elimination of the need for the complex circuit as heretofore used to produce such a signal, as well as compactness of the entire arrangement and reduced cost of the manufacture. Further, since the tape tension is in proportional relation with the aforementioned reference voltage, an excellent operational effect may be achieved including the possibility that the tape tension may be freely set to any desired value simply by adjusting the reference voltage.

While the present invention has been described with respect to one specific embodiment thereof, it is to be understood that the foregoing description is only exemplary of the invention and various modifications and changes may be made therein within the spirit and scope of the invention as defined the appended claims.

What is claimed is:

1. An apparatus for imparting a predetermined tension to a tape transported at a predetermined velocity from one to the other of reels mounted on a pair of reel spindles at least one of which is rotated by a motor to have a rotational torque imparted thereto, said apparatus comprising detector means associated with said reel spindle for providing a signal having a frequency proportional to the number of revolutions of said reel spindle, a multivibrator circuit adapted to provide, in response to said signal from said detector means, an impulse having a frequency corresponding to the period of said signal, an integration circuit adapted to be reset by said impulse, a sample-hold circuit adapted to be sampled by said impulse and having the output thereof connected to said motor, and a reference voltage source connected to said integration circuit, wherein a saw-tooth wave having a period equal to that of said signal available from said detector means is produced at the output side of said integration circuit, said integration circuit being reset by the impluse derived from said multi-vibrator circuit, said saw-tooth wave being applied to said sample-hold circuit so that a signal corresponding to the peak value of said saw-tooth wave is provided at the output side of said sample-hold circuit, the last-mentioned signal being one corresponding to the reciprocal of said number of revolutions which corresponds to the period of revolution of said reel spindle, and the signal provided at the output side of said sample-hold circuit is applied to said motor, whereby a predetermined tension is imparted to the tape.

* * * * *